United States Patent [19]

Schuetz et al.

[11] 4,007,655
[45] Feb. 15, 1977

[54] FLYING CUTTER WITH CONTINUOUS WORK PIECE SUPPORT

[75] Inventors: James W. Schuetz, Pittsburgh; William A. Martin, Volant, both of Pa.

[73] Assignee: Aetna-Standard Engineering Company, Ellwood City, Pa.

[22] Filed: July 31, 1975

[21] Appl. No.: 600,265

[52] U.S. Cl. .................................. 83/155; 83/320
[51] Int. Cl.² ....................................... B23D 25/04
[58] Field of Search ............. 83/320, 319, 318, 155

[56] References Cited

UNITED STATES PATENTS

| | | | |
|---|---|---|---|
| 951,840 | 3/1910 | Peterson | 83/320 |
| 2,894,559 | 7/1959 | Eccher | 83/318 X |
| 3,072,004 | 1/1963 | Jenkins | 83/318 |
| 3,076,369 | 2/1963 | Overman | 83/320 X |
| 3,354,765 | 1/1967 | Frey et al. | 83/318 X |
| 3,456,540 | 7/1969 | Manini | 83/320 X |
| 3,869,949 | 3/1975 | Dolle | 83/320 X |

Primary Examiner—Frank T. Yost
Attorney, Agent, or Firm—Mandeville and Schweitzer

[57] ABSTRACT

The disclosure is directed to improvements in flying cutters, particularly shears for severing light gage sheet or strip metal. Conventional flying shear mechanisms include a severing mechanism which is accelerated up to the speed of a moving strip or sheet material and then operated to sever the strip while moving synchronously therewith. The cutter mechanism is then returned to its starting position in readiness for a further operation. The present invention is directed to a novel and unique form of conveyor support, which is arranged in a novel manner to automatically extend or contract in accordance with movements of the shear, so that the sheet or strip material remains effectively continuously supported on both sides of the shear.

The conveyor support system of the invention includes driven conveyor elements, which are guided in part by the moving shear carriage, such that the relationship of the conveyor support to the shear carriage remains constant while the shear carriage is in motion along with the travelling sheet or strip material.

4 Claims, 5 Drawing Figures

FLYING CUTTER WITH CONTINUOUS WORK PIECE SUPPORT

BACKGROUND AND SUMMARY OF THE INVENTION

The present invention is directed to improvements in flying shear apparatus, particularly, but not necessarily, of the type described and claimed in the Dolle U.S. Pat. No. 3,869,949, granted Mar. 11, 1975 to Aetna-Standard Engineering Company, of Elwood City, Pennsylvania. The flying shear apparatus described in the beforementioned patent is designed and intended particularly for severing moving metal strip or sheet material. To this end, the shear mechanism includes a moveable carriage, which mounts opposed shear blades, and which is arranged to be advanced in the direction of, and at the same rate of speed as the moving strip material, throughout a short distance. When it is desired to sever the strip, the shear carriage is accelerated up to the speed of the strip and momentarily moved in synchronism therewith. During the moments of synchronous movement, the shear blades are actuated to sever the moving strip in the desired manner. The shear carriage is then returned to its starting position in preparation for a subsequent severing cycle.

In flying shears of known design, provisions have been made for supporting the cut leading edge of strip, as it leaves the shear carriage, in order that the leading edge may be properly guided to a subsequent stage of the handling or processing equipment. Such known provisions include a retractable conveyor system, as shown in the before-mentioned Dolle U.S. Pat. No. 3,869,949. Insofar as is known, however, prior systems have not provided appropriate means for the support of the strip material on the upstream or entry side of the shear carriage, such that a progressively increasing length of the strip material becomes unsupported as the shear carriage is traversed in the direction of strip movement during a shearing operation. In other words, with the shear carriage in its initial or upstream position, adequate conventional provisions can be made for the support of the incoming strip. However, as the carriage is accelerated and moved in a downstream direction along with the strip, in order to effect a severance thereof, a constantly lengthening span of unsupported strip material is accumulated between the shear carriage and the fixed strip supporting means at the incoming side of the equipment. Such a condition is acceptable when the strip material is adequately stiff and/or speeds of strip movement are relatively low. However, for thinner gage material, such as strip on the order of 0.007 inches in thickness, which may be processed at speeds in excess of 300 feet per minute, a substantial unsupported span of material may cause significant handling problems.

In accordance with the present invention, novel and advantageous means are provided for supporting strip material on both the upstream and downstream sides of a moving shear carriage, such that the support of the strip material remains constant even as the shear carriage is in motion.

Pursuant to the invention, a flying shear apparatus is provided with a novel form of strip supporting conveyor system, in which driven conveyor belt means are guided in part by a plurality of guide sheaves carried by the moving shear carriage. The arrangement of the moving guide means is such that driven strip-supporting conveyor elements are guided up to the shear carriage in the support plane or pass line of the strip material, then guided around underneath the carriage, and then returned to the support plane for the strip material on the immediate downstream side of the shear carriage. The shear carriage mounts a plurality of such guide sheaves, so arranged that the relationship of the conveying and supporting elements to the shear carriage remains constant, regardless of the position of the carriage, and this is achieved by guiding the conveyor-supporting elements underneath the carriage, using guide means mounted on the carriage itself and moveable therewith.

In the system of the invention, normally fixed strip supporting means are provided at the upstream and downstream sides of the shear carriage, and a novel intermediate support extends between the normally fixed means. The intermediate support has a constant effective working length and a constant relationship to the shear carriage, but varies with movements of the carriage. The arrangement is such that the intermediate support simultaneously lengthens on one side of the carriage and contracts on the other as the carriage moves.

For a more complete understanding of the above and other features and advantages of the invention, reference should be made to the following detailed description and to the accompanying drawings.

DESCRIPTION OF THE DRAWINGS

FIG. 1A is a simplified, schematic representation of a novel conveyor-support arrangement according to the invention, incorporated in the flying shear system of FIG. 1.

DESCRIPTION OF A PREFERRED EMBODIMENT

Figure 1:
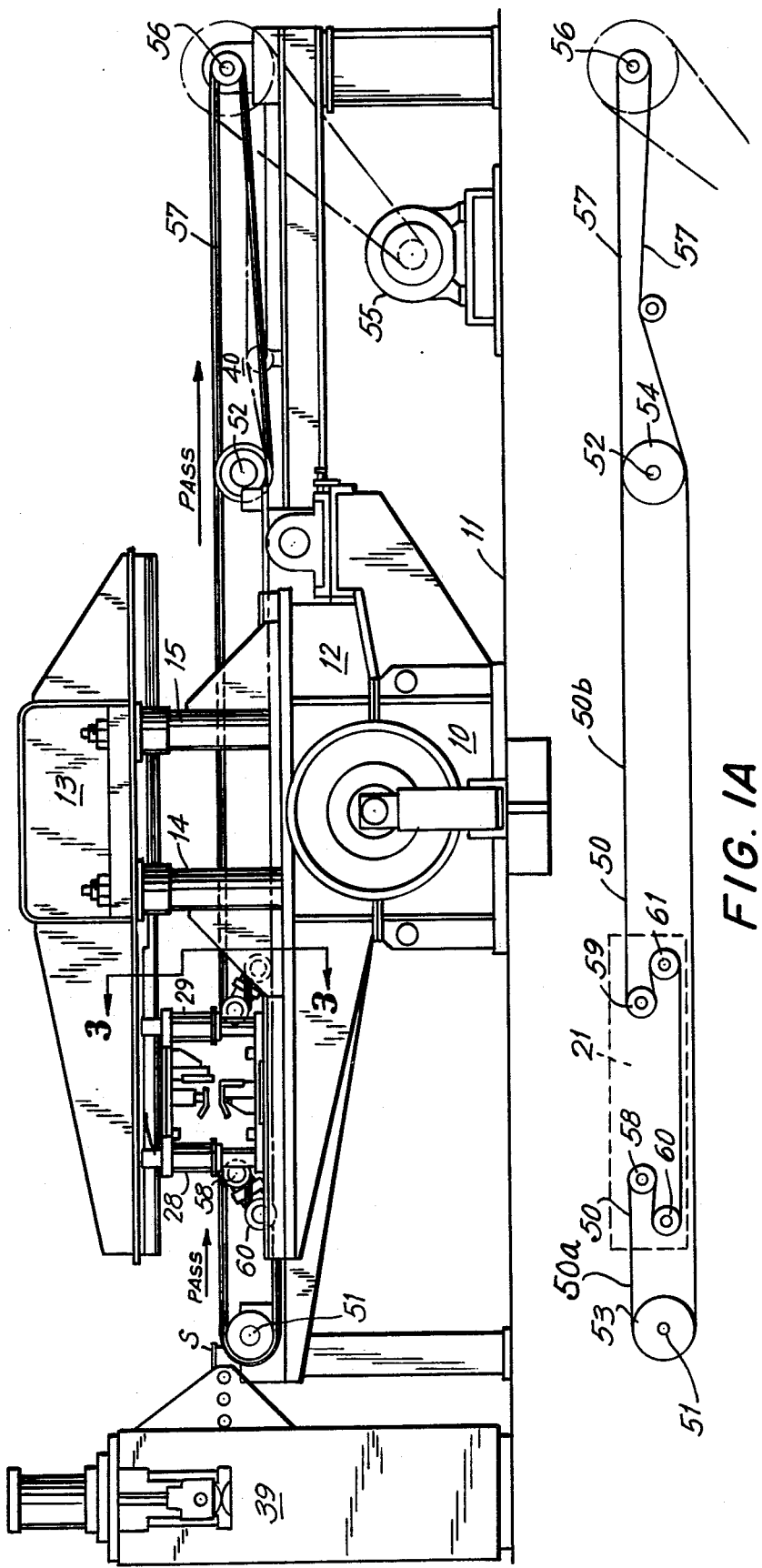
FIG. 1 is a side elevational view of a flying shear apparatus incorporating the new conveyor support arrangement of the invention.

Referring now to the drawings, the reference numeral 10 designates generally the lower supporting frame structure for a flying shear apparatus, supported on a structural foundation 11. The frame structure 10 supports a lower platen assembly 12 and an upper platen assembly 13. The lower platen assembly 12 is rigidly fixed to the support structure 10, while the upper platen assembly 13 is mounted on spaced pairs of pull rods 14, 15 for limited vertical reciprocating motion relative to the lower platen assembly.

Figure 2:
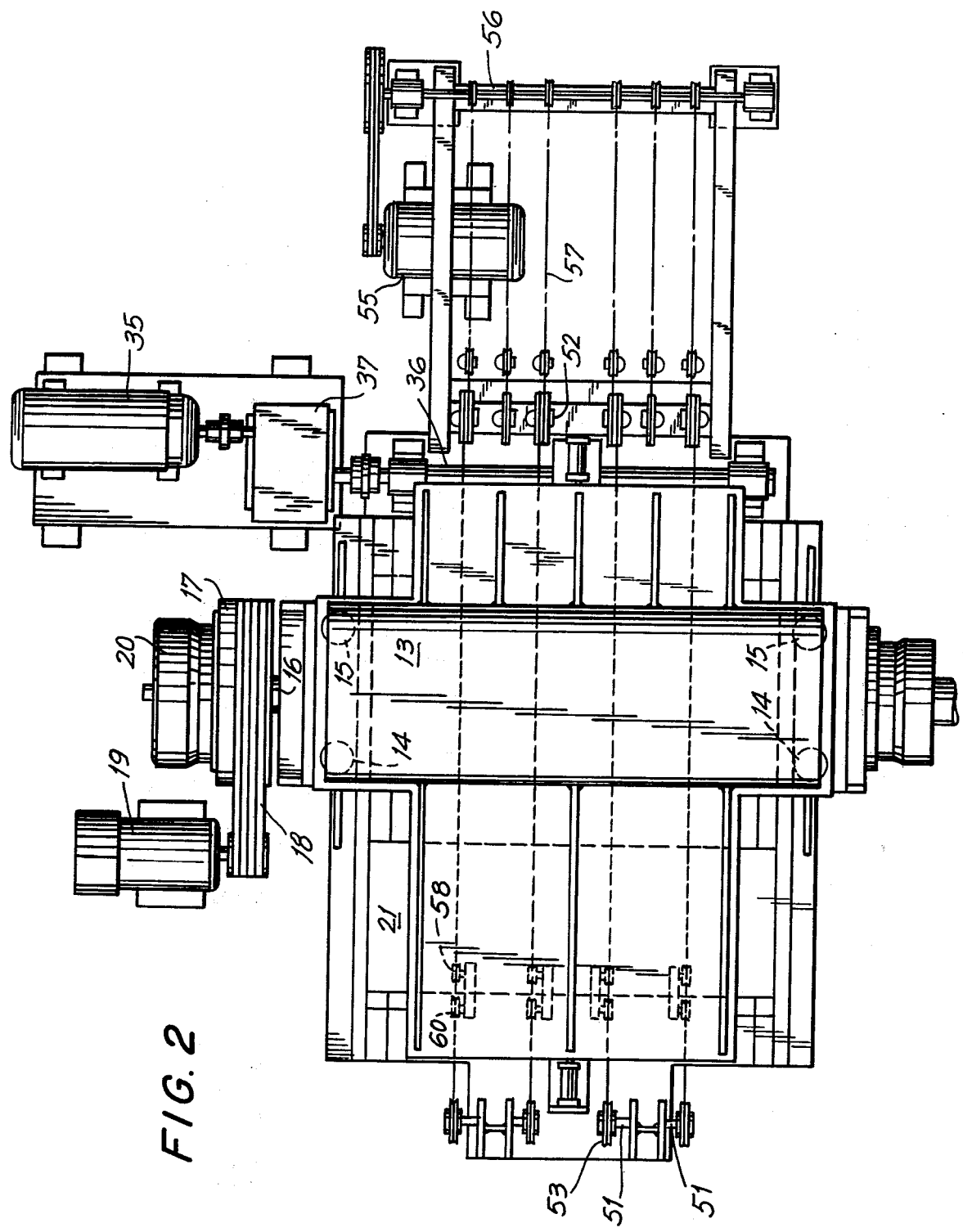
FIG. 2 is a top plan view of the apparatus of FIG. 1.

As described more fully in the before-mentioned Dolle U.S. Pat. No. 3,869,949, the upper platen assembly 13 is carried by crank mechanism (not specifically illustrated) including a crank shaft 16 (FIG. 2) arranged to be connected to a fly wheel 17, which is driven by belts 18 from a drive motor 19. A heavy duty, single revolution clutch mechanism 20 is connected between the fly wheel 17 and the crank shaft 16, such that the crank shaft is normally disengaged from the drive motor 19 and fly wheel 17, but is controllably connected thereto for a single revolution of the crank shaft, at desired times in order to effectuate a cutting operation.

Figure 4:
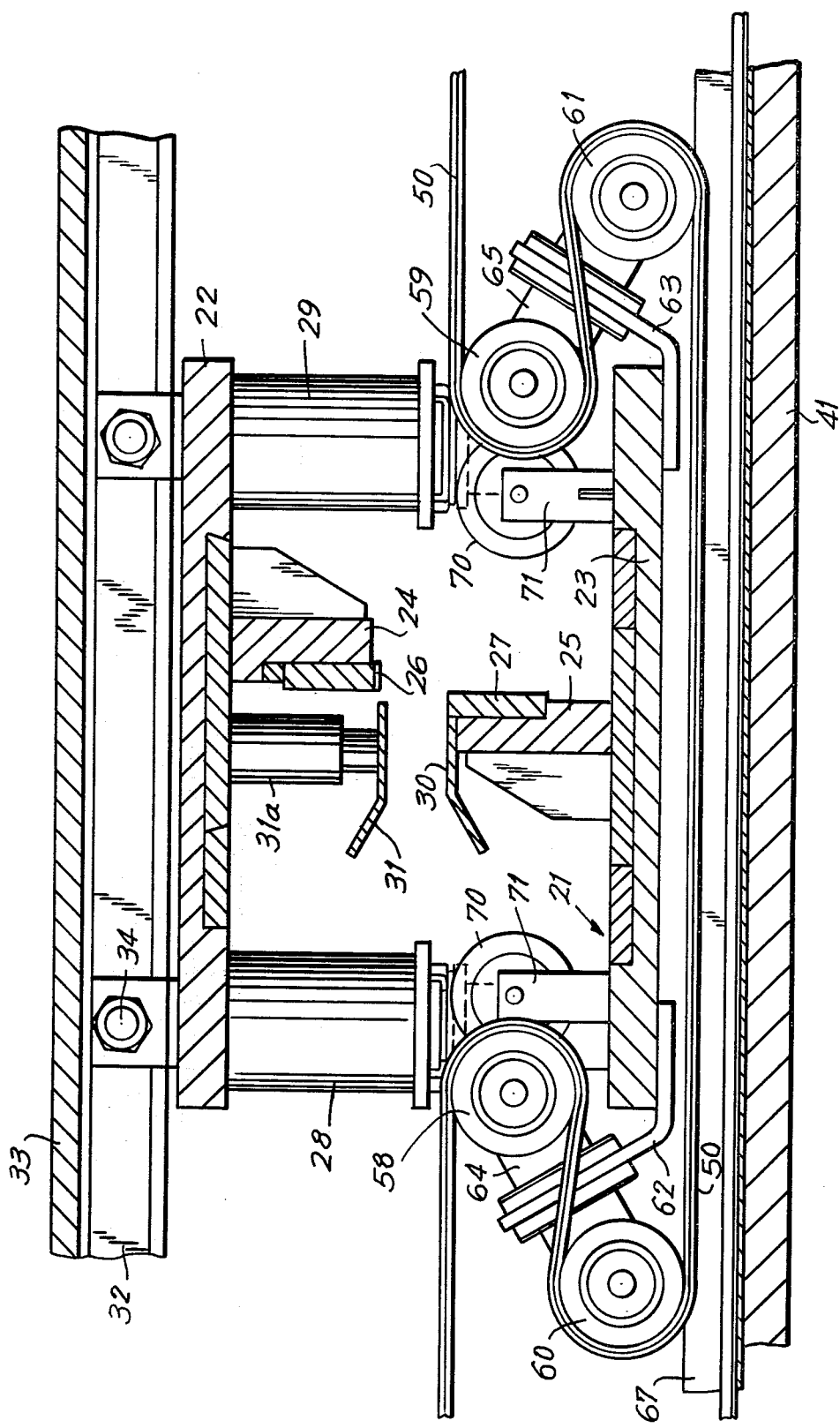
FIG. 4 is an enlarged, fragmentary cross-sectional view taken generally on line 4—4 of FIG. 3.

Located between the platen assemblies 12, 13 is a shear carriage, generally designated by the reference numeral 21 and illustrated in cross-sectional detail in FIG. 4. The carriage includes upper and lower carriage frame plates 22, 23, mounting shear blade supports 24, 25 and shear blades 26, 27. Reference may be made to the before-mentioned Dolle patent for details of advantageous means for mounting of the shear supports and blades, such details forming no part of the present invention.

As reflected in FIG. 4, the upper and lower shear carriage frame plates 22, 23 are connected at opposite sides by pairs of telescopic guide members 28, 29, which maintain precise vertical alignment of the frame plates and the shear blades 26, 27, while accommodating vertical movement thereof as required to bring the shear blades together in effectuating a shearing operation. Fixed and retractable strip guide elements 30, 31 are provided in association with the respective shear blades 27, 26 for proper pre-positioning of the metal strip immediately prior to cutting.

Figure 3:
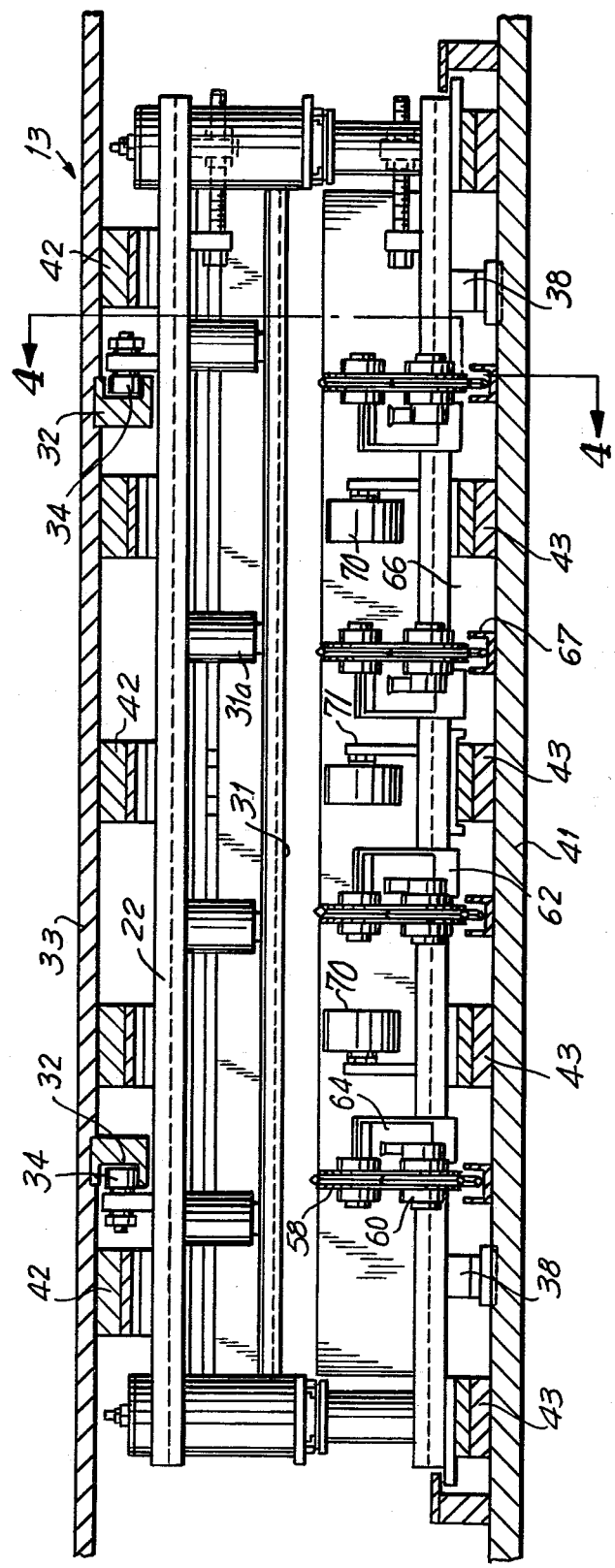
FIG. 3 is an enlarged, cross-sectional view taken generally on line 3—3 of FIG. 4.

As reflected in FIGS. 3 and 4, the upper shear carriage frame plate 22 is moveably suspended in the upper platen assembly 13, by means of channel rails 32, secured to a plate 33 of the upper platen assembly and engaging anti-friction rollers 34 carried on the upper frame plate 22 of the carriage. The anti-friction support provided by the roller 34 and channel guides 32 enable the entire carriage to be easily driven longitudinally along a predetermined path between the upper and lower platen assembly 12, 13. For this purpose, the flying shear installation is provided with a shear carriage drive motor 35 (FIG. 2) driving a shaft 36 through a gear box 37. The shaft 36 mounts suitable pinions (not shown) engageable with longitudinally disposed racks 38 (FIG. 3) secured to the lower frame plate 23 of the shear carriage 21, at each side.

In the operation of the equipment as described thus far, strip material S, in a generally continuous form, is advanced through a pinch roll stand 39 (FIG. 1), which defines in part the pass line for the strip material. The strip then passes through the shear carriage 21, between the opened shear blades 26, 27, and is discharged on the downstream side of the platen assemblies 12, 13 onto an exit side conveyor section 40, also defining in part the material pass line. At an appropriate time, when it is desired to sever the moving strip material, the drive motor 35 is energized to accelerate the shear carriage in a downstream direction (to the right as viewed in FIG. 1). The speed and power relationships are calculated to be such that, when the shear carriage moves into the main area of the platen assemblies 12, 13, between the sets of pull rods 14, 15, the carriage is moving synchronously with the strip material. At this point, the clutch mechanism 20 is actuated, driving the crank shaft 16 through a single revolution, and pulling the upper platen assembly 13 downward by means of the pull rods 14, 15. This causes the shear carriage assembly 21 to be compressed between the platen assemblies, moving the carriage plates 22, 23 toward each other. The strip is first contacted by the strip guides 30, 31 and then by the shear blades 26, 27, to sever the strip, the upper strip guide 31 being permitted to retract by a plurality of telescopic supports 31A provided for the purpose.

As reflected particularly in FIG. 3, the plate 33 of the upper platen assembly 13 and the plate 41 of the lower platen assembly 12 are provided with a plurality of transversely spaced, longitudinally extending upper and lower support bearing strips 42, 43. The platen plates 33, 41, forming part of the highly rigid structure of the platen assemblies 13, 12 respectively, transmit the compressive force of the shearing action into the shear carriage 21, through the various bearing strips 42, 43, while the shear carriage continues in motion in synchronism with the moving strip material S.

As described thus far, the illustrated flying shear equipment is functionally similar to that shown in the Dolle U.S. Pat. No. 3,869,949. In addition, in the apparatus of that patent, a retractable conveyor means is provided on the downstream or exit side of the shear platen, in order to pick up and guide the leading edge of the severed strip, as it passes through the shear carriage.

While the telescopic conveyor-support means of the Dolle patent serves adequately for the handling of relatively heavy gage strip or sheet material, processed at relatively slow speeds, certain problems arise in connection with the handling of light gage materials at higher speeds. Firstly, the lighter gage materials are more flexible and have a more acute need for support. In addition, when handling the strip material at higher speeds, a greater traverse movement is required of the shear carriage, and this inevitably leads to a greater unsupported span of the strip material on the entry or upstream side of the moving carriage. Further, the telescoping style of conveyor mechanism illustrated in the before-mentioned Dolle patent itself becomes more difficult to control as the strip speed, and therefore the carriage speed, becomes increasingly high.

In accordance with the present invention, a unique form of conveyor support arrangement is provided, in conjunction with a flying shear mechanism, which provides constant support of the strip material on both the entry and exit sides of the shear carriage, regardless of the position of the carriage and regardless of whether it is stationary or in motion at any given time. In addition, the conveyor support arrangement of the invention is designed so that its basic effective working dimensions remain constant, even though the shear carriage itself is driven through a substantial operating stroke, so that the conveyor system is not subjected to large acceleration forces involved in lengthening or shortening the effective length of the conveyor system to correspond to the momentary position of the shear carriage.

As shown particularly in FIGS. 1 and 1A, the improved flying shear system of the invention includes a plurality of primary conveyor belt elements 50, which are spaced transversely across the operating width of the equipment, between the sets of telescoping guides 28, 29 of the shear carriage 21. The number of primary supporting belts will, of course, be a function of the width capacity and strip weight to be accommodated by the machine. In the illustrated system, typical of a system for handling thin gage steel strip of 52 inch width, four primary supporting belts 50 are considered adequate. To advantage, these belts may be of a double-Vee (diamond) configuration for convenient tracking in Vee groove pulleys, the described configuration accommodating reverse bending of the belts around Vee groove pulleys 60, 61.

Shafts 51, 52, at each end of the machine frame structure 10 mount a plurality of pulleys 53, 54, constituting the principle guidance and support of the several belts 50. These belts are driven by means of a conveyor drive motor 55 driving a shaft 56 and auxiliary conveyor belts 57 forming the exit side conveyor 40. The driven belts 57 serve to drive the primary supporting belts 50, as will be understood.

In accordance with an important feature of the invention, the shear carriage 21 has mounted thereon a plurality of sets of upper pulleys 58, 59, and lower pulleys 60, 61, a complete set of four such pulleys 58-61 being provided for each of the individual primary belts 50. As reflected in FIG. 4, the lower carriage plate 23 has secured thereto pairs of brackets 62, 63, which extend outward and upward from the entry and exit edges of the plate and serve to mount bearing blocks 64, 65, for the pulleys 58-61. The general positioning of the pulleys 58-61 is significant, in that the upper sets of pulleys 58, 59, are positioned to guide the primary belts 50 substantially in the normal pass line of the equipment, and this would normally be such that the moving strip passes slightly above the strip guide 30 and lower shear blade 27. Likewise, the axes of the upper pulleys 58, 59 are located relatively close in toward the shear blade 27. Thus, in normal operation, the strip material passing through the shear carriage 21 is supported by the primary belts 50 up to a point close to the shear blade 27 on the entry side, and again at a point close to the shear blade 27 on the exit side, providing ample support for the strip and also maintaining it free of contact with the guide 30 and shear blade 27 in normal operations.

The lower sets of pulleys 60, 61 are positioned below the upper pulleys and are most advantageously, although perhaps not necessarily, spaced farther away from the shear blade 27 than the upper pulleys 58, 59. The design considerations, in this respect, would be not in the direction of spacing the lower pulleys outward of the upper pulleys, but rather in bringing the upper pulleys as close as practicable to the shear blade 27, and typically this is closer in toward the shear blade than is convenient or practicable with respect to the lower pulleys 60, 61. In accordance with the invention, the positioning of the lower carriage pulleys 60, 61 is such that the primary supporting belts 50 are guided underneath the lower plate 23 of the shear carriage, within the open spaces 66 formed between the longitudinally extending bearing elements 43 and the racks 38. To advantage, guide channels 67 may be provided on the lower platen plate 41, to both guide and protect the belts 67, as reflected particularly in FIG. 3.

As will be appreciated, with the several primary supporting belts 50 being trained about the entry side and exit side main pulleys 53, 54, and about the several carriage-mounted pulleys 58-61, the overall effective working length of the conveyor system does not change as the position of the shear carriage 21 is varied. Rather, a portion of each of the belts 50 is diverted from the pass line plane, underneath, the shear carriage 21, and back into the pass line plane on the opposite side of the carriage. As the carriage moves longitudinally up and down the pass line, only the diverted portions of the belts themselves change, as the location of the carriage-mounted pulleys 58-61 change with the moving carriage.

Thus, with reference to FIG. 1A, the carriage 21 is shown schematically in its starting position, prior to commencement of a shearing cycle. The supporting belts 50 are driven from the shaft 56 and motor 55 at a speed appropriate to the speed of travel of the strip material S, as will be understood. In order to initiate a shearing cycle, the carriage 21 is accelerated and moved to the right. As it does so, the portions 50A of the primary belts, on the upstream or entry side of the carriage 21, automatically lengthen, keeping the entry side strip support constant in relation to the moving carriage. At the same time, the belt portions 50B on the downstream or exit side of the carriage are correspondingly shortened, so that the exit side support also remains constant relative to the moving carriage. This desirable result is achieved without requiring any moving or accelerating take-up and release of the conveyor belt system. On the contrary, the moving sets of carriage-mounted pulleys 58-61 merely progressively displace new portions of the supporting belts 50, constantly extending the support on one side of the carriage and correspondingly retracting it on the other, while the overall working length of the conveyor system remains constant. The belt systems will, of course, be provided with conventional belt take-up or tensioning means (not shown), but these are merely passive controls and do not respond to movements of the shear carriage 21, as in the case of telescopic conveyor systems heretofore known.

As reflected in FIGS. 3 and 4, the shear carriage 21 of the invention may also incorporate to advantage auxiliary idler rolls 70, which are mounted on the lower carriage plate 23 by supports 71. The idlers 70 typically may be rubber rollers, provided with a suitably serrated surface, and these are mounted between the respective sets of primary supporting belts 50, for support of intermediate areas of the strip in the immediate vicinity of the shear blades. The auxiliary rollers are particularly helpful when processing strip gages which are narrower than the full width of the machine. Inertial effects may be minimized by making the idler roller 70 of lightweight construction.

The flying cutter apparatus of the invention is significantly advantageous in connection with the processing of light gages of strip and sheet material moving at high speeds. Under such conditions, the traditionally tolerated unsupported strip area at the side of the cutter carriage can present significant problems, deriving both from the thinness of the strip material and from relatively longer unsupported span necessitated by the higher operating speeds. The apparatus of the invention uniquely solves the problems inherent in these circumstances by providing for a conveyor support system of constant effective working length which, however, has a displaceable portion leading into the entry side of the carriage and away from the exit side of the carriage and, in between, being diverted underneath the carriage. As the carriage moves, the portions of the belts which are diverted under the carriage move with the carriage, so that the support of the moving strip in relation to the carriage itself never varies.

By providing for the primary support conveyor to have a constant effective working length, the movement of structural components associated with travel of the cutter carriage is minimized. In practical effect, the movement of the carriage and the variable relationship of the entry side and exit side strip support is achieved merely by progressive displacement of the primary belts 50, which are of minimum mass and can be displaced at high speed without difficulty.

The system of the invention, although not necessarily restricted thereto, is significantly advantageous for use in connection with the processing of sheet and strip material, which is of light gage, processed at high speed, or, more typically, both. The new system enables a high speed moving shear operation to be carried out while providing complete and constant support for the strip on both the entry and exit sides of the constantly moving shear carriage.

It should be understood, of course, that the specific form of the invention herein illustrated and described is intended to be representative only, as certain changes may be made therein without departing from the clear teachings of the disclosure.

We claim:

1. A flying cutter apparatus for cutting a web into lengths, characterized by
   a. a cutter carriage;
   b. a carriage supporting structure including telescopically connected upper and lower platen structures;
   c. said cutter carriage carried by said supporting structure and movable thereon along a strip pass line through said apparatus between first and second limit positions;
   d. opposed upper and lower shear blades on said cutter carriage;
   e. said upper and lower platen structures supporting and confining said cutter carriage and operative upon telescopic closing movement to compress said carriage and actuate said opposed shear blades through a cutting motion;
   f. a plurality of transversely spaced, longitudinally extending slide elements on said platen structures and said carriage;
   g. strip conveyor guide means including a plurality of transversely spaced guide belts for conveying strip through said apparatus;
   h. said strip conveyor guide means including entry-side guide means for supporting the strip upstream of said first carriage limit position, exit-side guide means for supporting the strip downstream of said second carriage limit position, and intermediate strip supporting means between said entry-side and exit-side guide means;
   i. said intermediate strip supporting means mounted on said carriage for guiding said spaced belts along said pass line to and from points adjacent said shear blades, and in the region between said points guiding said belts below said carriage; and
   j. said conveyor guide means including means between said lower platen structure and said carriage for guiding said spaced belts between said transversely spaced slide elements.

2. The apparatus of claim 1, further characterized by
   a. said slide elements including a plurality of longitudinally disposed guiding and supporting rails; and
   b. said rails defining in part conveyor guide belt passageways between said carriage and said lower platen structure.

3. A flying cutter apparatus according to claim 1, further characterized by
   a. said guide means for each conveyor belt comprising a pair of upper and lower guide wheels carried by said carriage on opposite sides of the cutter,
   b. said upper guide rolls supporting said belts generally in the pass line and said lower guide rolls diverting said belts below and underneath said carriage.

4. A flying cutter apparatus according to claim 3, further characterized by
   a. said upper guide wheels being positioned closer to the cutter than the lower guide wheels.

* * * * *